(12) United States Patent
Tanaka et al.

(10) Patent No.: US 7,909,729 B2
(45) Date of Patent: Mar. 22, 2011

(54) CONTROL UNIT FOR AN ELECTRIC OIL PUMP

(75) Inventors: Masashi Tanaka, Utsunomiya (JP); Ryo Nishikawa, Utsunomiya (JP); Hisayoshi Arai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1182 days.

(21) Appl. No.: 11/542,144

(22) Filed: Oct. 4, 2006

(65) Prior Publication Data

US 2007/0080582 A1   Apr. 12, 2007

(30) Foreign Application Priority Data

Oct. 7, 2005   (JP) .................................. 2005-294869

(51) Int. Cl.
*H02P 15/00* (2006.01)

(52) U.S. Cl. ............ 477/8; 475/127; 475/128; 475/129; 477/14; 477/180; 192/85.63; 192/103 F; 192/82 T

(58) Field of Classification Search ................ 477/8, 14, 477/180; 475/127–129, 116–117; 192/85.63, 192/103 F, 82 T; 303/20, 22.1
See application file for complete search history.

(56) References Cited

U.S. PATENT DOCUMENTS

| 5,291,804 | A | * | 3/1994 | Kashihara et al. | 475/127 |
| 5,634,869 | A | * | 6/1997 | Mikami et al. | 477/154 |
| 6,050,918 | A | * | 4/2000 | Kuramoto | 477/157 |
| 6,387,005 | B1 | * | 5/2002 | Matsuyama et al. | 475/75 |
| 6,565,473 | B2 | * | 5/2003 | Endo et al. | 475/117 |

FOREIGN PATENT DOCUMENTS

| JP | 2000-046171 A | 2/2000 |
| JP | 2002-130449 A | 5/2002 |
| JP | 2003-054279 A | 2/2003 |
| JP | 2004-100827 A | 4/2004 |

\* cited by examiner

*Primary Examiner* — Robert A Siconolfi
*Assistant Examiner* — James K Hsiao
(74) *Attorney, Agent, or Firm* — Arent Fox LLP

(57) ABSTRACT

A control unit for an electric oil pump of the present invention includes: a one-way valve that permits circulation of operating fluid from the electric oil pump to the friction engagement device and blocks circulation in the opposite direction; an accumulator that is connected to a fluid supply path joining the one-way valve to the friction engagement device and accumulates hydraulic pressure required for operating the friction engagement device; a hydraulic pressure measuring device that measures hydraulic pressure inside the fluid supply path; a vehicle speed measuring device that measures a vehicle speed of the vehicle; and a pressure setting device that sets a first predetermined pressure based on the vehicle speed measured by the vehicle speed measuring device.

6 Claims, 12 Drawing Sheets

CONTROL UNIT FOR AN ELECTRIC OIL PUMP

Priority is claimed on Japanese Patent Application No. 2005-294869, filed Oct. 7, 2005, the contents of which are incorporated herein by reference.

BACKGROUND OF THE INVENTION

1. Field of the Invention

The present invention relates to a control unit for an electric oil pump.

2. Description of Related Art

A technology is disclosed in Japanese Unexamined Patent Application, First Publication No. 2004-100827 in which there are provided a clutch that is installed between a power source for driving a vehicle and vehicle wheels and that enables driving power to either be supplied or suspended, and an electric oil pump that supplies hydraulic pressure for engaging the clutch. The hydraulic pressure required to engage the clutch is supplied by controlling the revolution speed of the electric oil pump in accordance with the driving condition (i.e., driving load) of the vehicle.

A technology is disclosed in Japanese Unexamined Patent Application, First Publication No. 2003-54279 in which there are provided a clutch that is installed between an electric motor for driving a vehicle and the vehicle wheels and that enables driving power to either be supplied or suspended, an accumulator that accumulates hydraulic pressure for engaging the clutch, and an electric oil pump that supplies hydraulic pressure to this accumulator. Operations of the electric oil pump are controlled so that the pressure in the accumulator reaches a predetermined value or greater.

However, when the revolution speed of the electric oil pump is controlled in accordance with the driving condition of the vehicle as in the technology disclosed in Japanese Unexamined Patent Application, First Publication No. 2004-100827, a considerable time is necessary to raise the hydraulic pressure to the pressure required to engage the clutch. Accordingly, it is difficult for this technology to respond to a rapid acceleration demand from a driver and a slight response delay is generated so that there is a deterioration in drivability.

In contrast, in the technology disclosed in Japanese Unexamined Patent Application, First Publication No. 2003-54279, irrespective of whether the electric motor for driving is operating at low revolutions or at high revolutions (namely, irrespective of the revolution speed of the electric motor), because the hydraulic pressure supplied to the clutch is held at a constant predetermined pressure to match the constant torque that the electric motor is able to output, when the pressure in the accumulator drops below the predetermined pressure, the electric oil pump is driven continuously so as to raise the hydraulic pressure. If this technology is employed, the electric oil pump is operated extremely frequently which tends to cause power consumption to increase.

Therefore, the present invention provides a control unit for an electric oil pump that makes it possible to always secure the hydraulic pressure required to engage a clutch and that makes it possible to reduce power consumption by the electric oil pump.

SUMMARY OF THE INVENTION

In order to solve the above described problems the present invention employs the followings.

Namely, the present invention employs a control unit for an electric oil pump that supplies a hydraulic pressure to a friction engagement device that enables driving power from an electric motor that is a driving source of a vehicle to be supplied or suspended between the electric motor and wheels of the vehicle, including: a one-way valve that permits a circulation of an operating fluid from the electric oil pump to the friction engagement device and blocks the circulation in an opposite direction; an accumulator that is connected to a fluid supply path joining the one-way valve to the friction engagement device and accumulates a hydraulic pressure required for operating the friction engagement device; a hydraulic pressure measuring device that measures hydraulic pressure inside the fluid supply path; a vehicle speed measuring device that measures a vehicle speed of the vehicle; and a pressure setting device that sets a first predetermined pressure based on the vehicle speed measured by the vehicle speed measuring device, wherein when the friction engagement device is in an engaged state and the hydraulic pressure inside the fluid supply path measured by the hydraulic pressure measuring device falls below the first predetermined pressure, the electric oil pump is operated in a high-pressure mode and the hydraulic pressure is supplied from this electric oil pump to the fluid supply path.

According to this control unit for an electric oil pump, when the hydraulic pressure inside the fluid supply path falls below the first predetermined pressure, it is possible to supply hydraulic pressure from the electric oil pump to the fluid supply path and raise the pressure inside the fluid supply path to the first predetermined pressure or greater. As a result, the friction engagement device can be operated using hydraulic pressure that is always accumulated in an accumulation device. Moreover, because the first predetermined pressure is set by the pressure setting device based on the vehicle speed, the first predetermined pressure can be set so as to correspond to the output characteristics of the electric motor. Accordingly, the frequency of operation of the electric oil pump can be reduced while the hydraulic pressure required to operate the friction engagement device is always secured in the fluid supply path. As a result, it is possible to reduce the power consumption of the electric oil pump while satisfying the operating requirements of the friction engagement device.

The first predetermined pressure may be a pressure that enables the maximum torque that can be output by the electric motor for the vehicle speed measured by the vehicle speed measuring device to be transmitted by the friction engagement device.

In this case, the maximum torque that can be output by the electric motor in accordance with the vehicle speed can be reliably transmitted in the power transmission mechanism.

It may be arranged such that when the hydraulic pressure measured by the hydraulic pressure measuring device exceeds a second predetermined pressure that is greater than the first predetermined pressure, the electric oil pump is operated in a low-pressure mode and the supply of the hydraulic pressure from this electric oil pump to the fluid supply path is stopped.

In this case, it is possible to prevent the hydraulic pressure in the fluid supply path becoming greater than necessary.

The control unit for an electric oil pump may further include a fluid temperature measuring device that measures a fluid temperature inside the fluid supply path, and the second predetermined pressure may be set in accordance with the fluid temperature measured by the fluid temperature measuring device or with the vehicle speed measured by the vehicle speed measuring device.

In this case, the second predetermined pressure can be changed in accordance with the situation.

It may be arranged such that when the friction engagement device is in a disengaged state and the hydraulic pressure inside the fluid supply path measured by the hydraulic pressure measuring device falls below a third predetermined pressure that is set lower than the first predetermined pressure irrespective of the vehicle speed, the electric oil pump is operated in a high-pressure mode and the hydraulic pressure is supplied from this electric oil pump to the fluid supply path.

In this case, when the electric motor is switched from a stopped state to an operating state, the operating requirements of the friction engagement device can be responded to rapidly. As a result, there is an improvement in responsiveness.

The control unit for an electric oil pump may further include a fluid temperature measuring device that measures a fluid temperature of fluid supplied to the friction engagement device, and the first predetermined pressure may be corrected based on the fluid temperature measured by the fluid temperature measuring device.

In this case, because the first predetermined pressure can be set accurately, the frequency of operation of the electric oil pump in high-pressure mode can be is reduced so that power consumption can be reduced even further.

DETAILED DESCRIPTION OF THE INVENTION

Embodiments of a control unit for an electric oil pump according to the present invention will now be described with reference to FIGS. 1 through 13.

Figure 1:
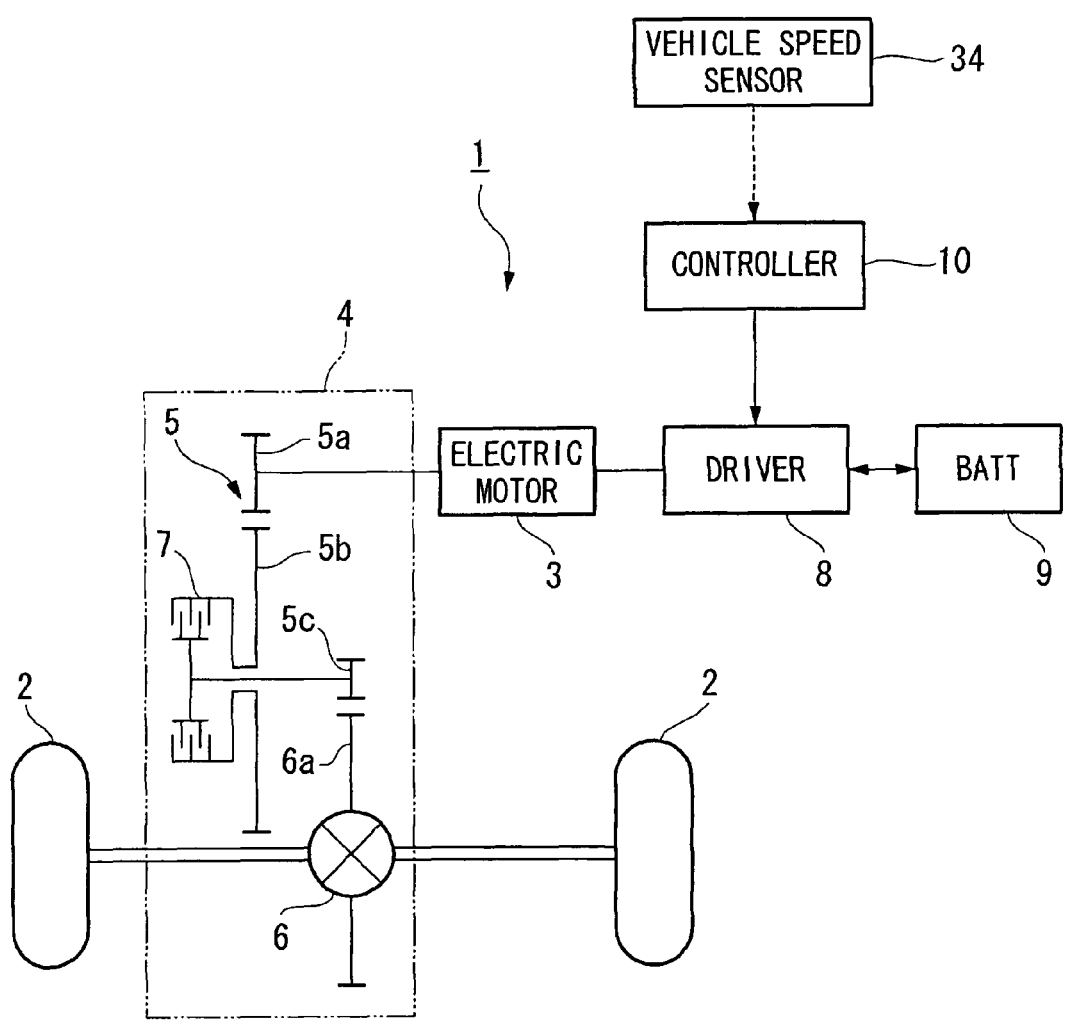
FIG. 1 is a schematic structural view showing a driving system for a vehicle that is provided with a control unit for an electric oil pump according to the present invention.

FIG. 1 shows the schematic structure of a rear wheel driving system of a hybrid vehicle that is provided with the control unit for an electric oil pump according to the present invention. Front wheels of this vehicle 1 are driven by a main driving source such as an engine or the like (these are omitted from the drawings), while rear wheels 2 of the vehicle 1 are driven by an electric motor (i.e., a motor) 3 being an auxiliary driving source via a power transmission mechanism 4.

The power transmission mechanism 4 is provided with a deceleration mechanism 5 into which power is input from the electric motor 3, and a differential gear 6 that distributes power output from the deceleration mechanism 5 to the left and right rear wheels 2. The deceleration mechanism 5 is provided with a deceleration gear train that is made up of a first gear 5a that is fixed to an output shaft of the electric motor 3, a second gear 5b that meshes with the first gear 5a, and a third gear 5c that meshes with an input gear 6a of the differential gear 6.

A hydraulic clutch 7 is installed between the second gear 5b and the third gear 5c. When the hydraulic clutch 7 is engaged, the second gear 5b and the third gear 5c are connected and power from the electric motor 3 can be transmitted via the power transmission mechanism 4 to the rear wheels 2. When the hydraulic clutch 7 is disengaged, the connection between the second gear 5b and the third gear 5c is released and the transmission of power from the electric motor 3 to the rear wheels 2 is suspended.

The electric motor 3 is connected via a motor driver circuit 8 to a battery 9 that is mounted in the vehicle. The motor driver circuit 8 is controlled by a controller 10 in the form of a computer. Starting assistance control to drive the rear wheels 2 is performed by the electric motor 3 when the vehicle is started on a snowy road or bad road. When the vehicle 1 is decelerating, electricity is generated by the electric motor 3 and regenerative control to charge the battery 9 is performed. When this type of starting assistance control or regenerative control is performed, the hydraulic clutch 7 is engaged and the power transmission mechanism 4 is placed in a power transmitting capable state. Apart from these times, in order to prevent any reduction in the durability of the electric motor 3 and prevent the occurrence of any power loss, the hydraulic clutch 7 is released and the power transmission mechanism 4 is placed in a state in which power transmission is suspended. Note that the controller 10 receives the input of electrical signals in accordance with the speed of the vehicle 1 that is measured by the vehicle speed sensor 34.

Figure 2:
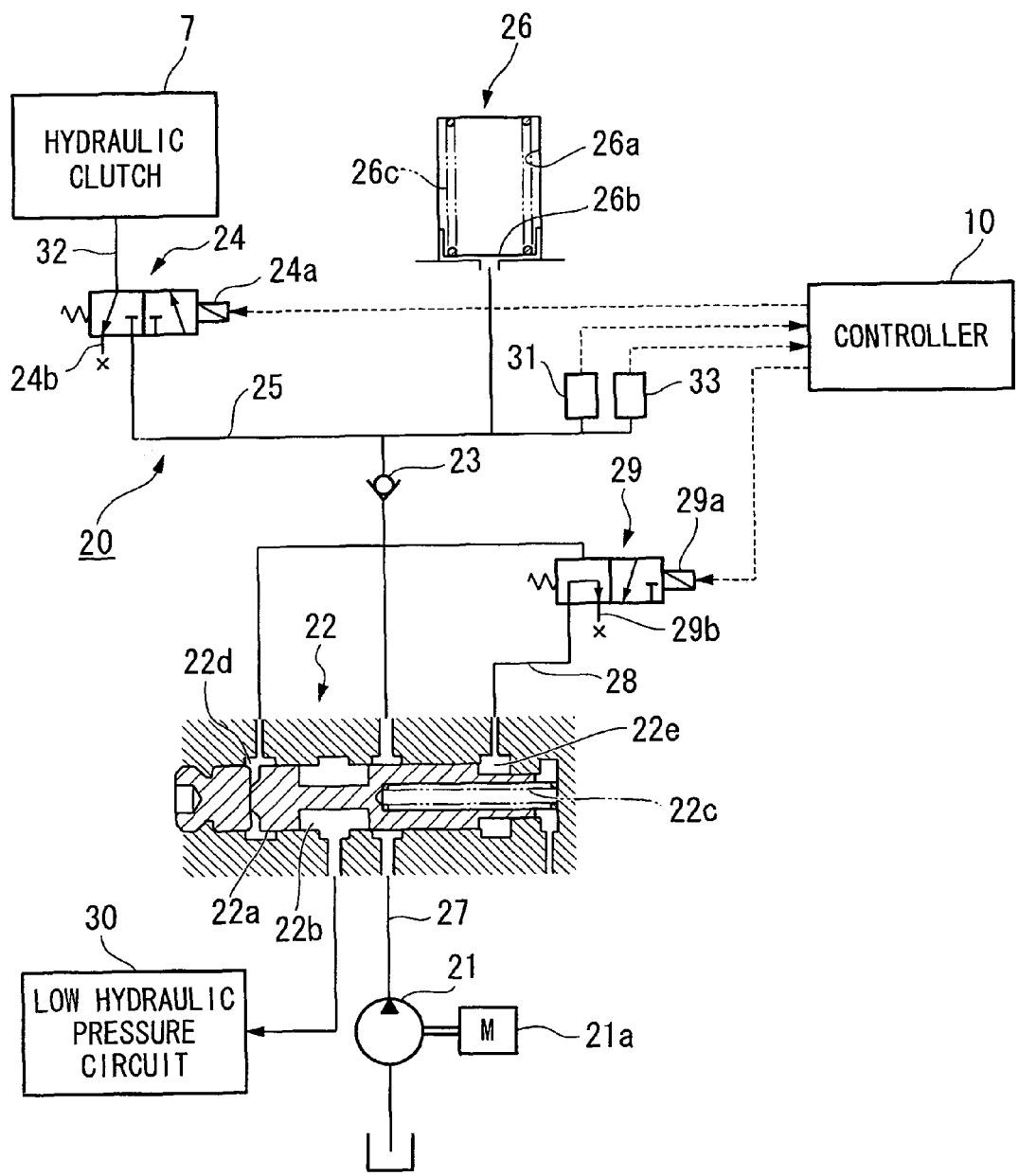
FIG. 2 is a diagram of a hydraulic circuit that is used to control a hydraulic clutch incorporated in a power transmission mechanism of the above driving system.

A hydraulic circuit 20 that controls the hydraulic clutch 7 is shown in FIG. 2. In this hydraulic circuit 20, hydraulic fluid that is discharged from an electric oil pump 21 is able to be supplied to the hydraulic clutch 7 via a regulator valve 22, a one-way valve 23, and a clutch control valve 24. An accumulator (i.e., an accumulating device) 26 is connected to a fluid supply path 25 that joins the one-way valve 23 to the clutch control valve 24. The electric oil pump 21 is driven by a position sensorless-brushless direct current motor in the form of an electric motor 21a. A hydraulic pressure sensor (i.e., a hydraulic pressure measuring device) 31 that measures the hydraulic pressure in the fluid supply path 25 and a fluid temperature sensor (i.e., a fluid temperature measuring device) 33 that measures the fluid temperature in the fluid supply path 25 are provided on the fluid supply path 25. The hydraulic pressure sensor 31 and the fluid temperature sensor 33 output electrical signals in accordance with the measured hydraulic pressure or fluid temperature to the controller 10. The fluid temperature sensor 33 also functions as a fluid temperature measuring device that measures the fluid temperature of the fluid supplied to the hydraulic clutch 7 (i.e., a friction engagement device). The fluid temperature sensor 33 can also be installed in a location where there is a correlation with the fluid temperature inside the fluid supply path 25. It is also possible to replace the fluid temperature with parameters having a correlation with the fluid temperature inside the fluid supply path 25.

The clutch control valve 24 is formed by an electromagnetic three-way valve that is controlled by the controller 10. When a solenoid 24a of the clutch control valve 24 is energized, the fluid supply path 25 is connected to a clutch fluid path 32 that is connected in a line to the hydraulic clutch 7 and supplies fluid to the hydraulic clutch 7 thereby engaging the hydraulic clutch 7. When the energizing of the solenoid 24a is stopped, the connection between the fluid supply path 25 and the clutch fluid path 32 is broken and the clutch fluid path 32 is connected to a drain port 24b. The fluid is then drained from the hydraulic clutch 7 and the hydraulic clutch 7 is disengaged.

The accumulator 26 is provided with a piston 26b that is housed in a pressure accumulation chamber 26a that communicates with the fluid supply path 25, and with a spring 26c that imparts back pressure to the piston 26b. As a result of the fluid pressure on the fluid supply path 25, the piston 26b is moved back while opposing the urging force of the spring 26c and the hydraulic fluid is accumulated in the pressure accumulation chamber 26a. The quantity of fluid that is accumulated in the accumulator 26 changes in accordance with the fluid pressure in the fluid supply path 25, and the quantity of fluid increases as the fluid pressure in the fluid supply path 25 increases.

The one-way valve 23 allows hydraulic fluid to circulate from the regulator valve 22 to the fluid supply path 25, while preventing any circulation in the reverse direction.

The regulator valve 22 is connected to a pump fluid path 27 that joins the electric oil pump 21 to the one-way valve 23 and is provided with a spool 22a that connects together or blocks the connection between the pump fluid path 27 and the drain port 22b. The spool 22a is urged by a spring 22c in a direction in which it blocks the connection between the pump fluid path 27 and the drain port 22b (i.e., to the left in FIG. 2—referred to below as the "non-draining direction"), and is pushed by fluid pressure in the pump fluid path 27 that is input into a fluid chamber 22d (shown on the left edge in the drawing) in a direction in which it connects together the pump fluid path 27 and the drain port 22b (i.e., to the right in FIG. 2—referred to below as the "draining direction"). It is also pushed by fluid pressure that is input into a fluid chamber 22e (shown on the right edge in the drawing) in the non-draining direction.

The fluid chamber 22e on the right end of the regulator valve 22 can be connected to the pump fluid path 27 via a pilot fluid path 28 and a switching control valve 29. The switching control valve 29 is formed by an electromagnetic three-way valve that is controlled by the controller 10. When a solenoid 29a of the switching control valve 29 is being energized, the pump fluid path 27 is connected to the pilot fluid path 28, and the fluid pressure of the pump fluid path 27 is input into the fluid chamber 22e. When the energizing of the solenoid 29a is stopped, the connection between the pump fluid path 27 and the pilot fluid path 28 is broken, the pilot fluid path 28 is connected to the drain port 29b, and the fluid chamber 22e is opened to the atmosphere.

A low hydraulic pressure circuit 30 is connected to the drain port 22b of the regulator valve 22. The low hydraulic pressure circuit 30 is used to supply fluid whose pressure has been raised by the electric oil pump 29 to the differential gear 6 of the power transmission mechanism 4 and to bearing portions and the like of the deceleration mechanism 5 as lubrication fluid, and to also supply it to the driving electric motor 3 as cooling fluid.

It is necessary for the electric oil pump 21 to be driven constantly so that the differential gear 6 and the third gear 5c of the power transmission mechanism 4 are continually rotating while the vehicle is running, and also so that bearing portions of the differential gear 6 and the third gear 5c are continually lubricated. However, for this type of purpose, a comparatively low hydraulic pressure is sufficient for the low hydraulic pressure circuit 30.

In contrast, the hydraulic pressure to engage the hydraulic clutch 7 needs to be a comparatively high hydraulic pressure sufficient to enable output torque from the electric motor 3 to be transmitted to the power transmission mechanism 4. Here, once a certain amount of hydraulic pressure has accumulated in the accumulator 26, even if the regulator valve 22 is turned to the low-pressure side, circulation of fluid from the fluid supply path 25 to the regulator valve 22 side is obstructed by the one-way valve 23. As a result, the hydraulic clutch 7 can be engaged by hydraulic pressure accumulated in the accumulator 26. However, because the fluid in the hydraulic clutch 7 is discharged from the drain port 24b of the clutch control valve 24 when the hydraulic clutch 7 is disengaged, the fluid accumulated in the accumulator 26 is consumed if the hydraulic clutch 7 is repeatedly engaged and disengaged, the quantity of fluid in the accumulator 26 gradually decreases and there is a corresponding decrease in hydraulic pressure in the fluid supply path 25. Moreover, because there are (extremely small) leakages of fluid from oil seal portions and cracks and the like in the clutch control valve 24, a decrease in hydraulic pressure occurs in the fluid supply path 25 because of this as well. If the hydraulic pressure in the fluid supply path 25 drops below a predetermined bottom pressure limit $P_{L \to H}$, then it becomes difficult to reliably engage the hydraulic clutch 7. Because of this, it is necessary to switch the regulator valve 22 to the high-pressure side, and supply fluid from the electric oil pump 21 via the regulator valve 22 to the oil supply path 25 so that the hydraulic pressure in the fluid supply path 25 in the accumulator 26 is raised.

In this manner, even if the electric oil pump 21 is operated continuously, if the regulator valve 22 is switched between the low-pressure side and the high-pressure side in accordance with the driving condition of the vehicle, it is possible to reduce the load on the electric oil pump 21 and the size of the electric motor 21a of the electric oil pump 21 can be reduced.

Therefore, in this control unit for an electric oil pump, when the hydraulic pressure drops below a bottom pressure limit (i.e., a first predetermined pressure) $P_{L \to H}$, the electric oil pump switches to a high pressure mode (i.e., HI mode) and the hydraulic pressure in the pump fluid path 27 is input into the fluid chamber 22e of the regulator valve 22 by the switching control valve 29. As a result, the regulator valve 22 is switched to the high-pressure side and when the hydraulic pressure in the fluid supply path 25 exceeds a top pressure limit (i.e., a second predetermined pressure) $P_{H \to L}$, the regulator valve 22 is switched to low-pressure mode (LOW mode), the fluid chamber 22e of the regulator valve 22 is opened to the atmosphere by the switching control valve 29, and the regulator valve 22 is switched to the low-pressure side.

Here, it is necessary for the bottom pressure limit $P_{L \to H}$, which is a threshold value for switching the operating mode of the electric oil pump 21 from low-pressure mode to high-pressure mode, to be set either to the bottom limit value of the hydraulic pressure that is still able to secure the required transmission capacity (i.e., the engaging force that is required to transmit the power of the electric motor 3) for the hydraulic clutch 7, or to a pressure that is slightly higher than this.

If the hydraulic clutch 7 is switched from a disengaged state to an engaged state while the vehicle 1 is running, then, generally, the revolution speed of the driving side and the driven side of the hydraulic clutch are substantially synchronized, however, at this time it is necessary to secure the required transmission capacity (i.e., the engaging force that is required to transmit the power of the electric motor 3) for the hydraulic clutch 7.

The driving electric motor 3 has an output characteristic whereby the maximum torque that can be output decreases as the revolution speed increases. Therefore, in this control unit for an electric oil pump, by altering the bottom pressure limit $P_{L \to H}$ in accordance with the vehicle speed, the required transmission capacity when the hydraulic clutch 7 is being engaged is secured. As a result, the bottom pressure limit $P_{L \to H}$ is altered in accordance with the output characteristics of the electric motor 3. Accordingly, the frequency of operation of the electric oil pump 21 in high-pressure mode is reduced and a reduction in the power consumption of the electric oil pump 21 is achieved.

First Embodiment

Figure 3:
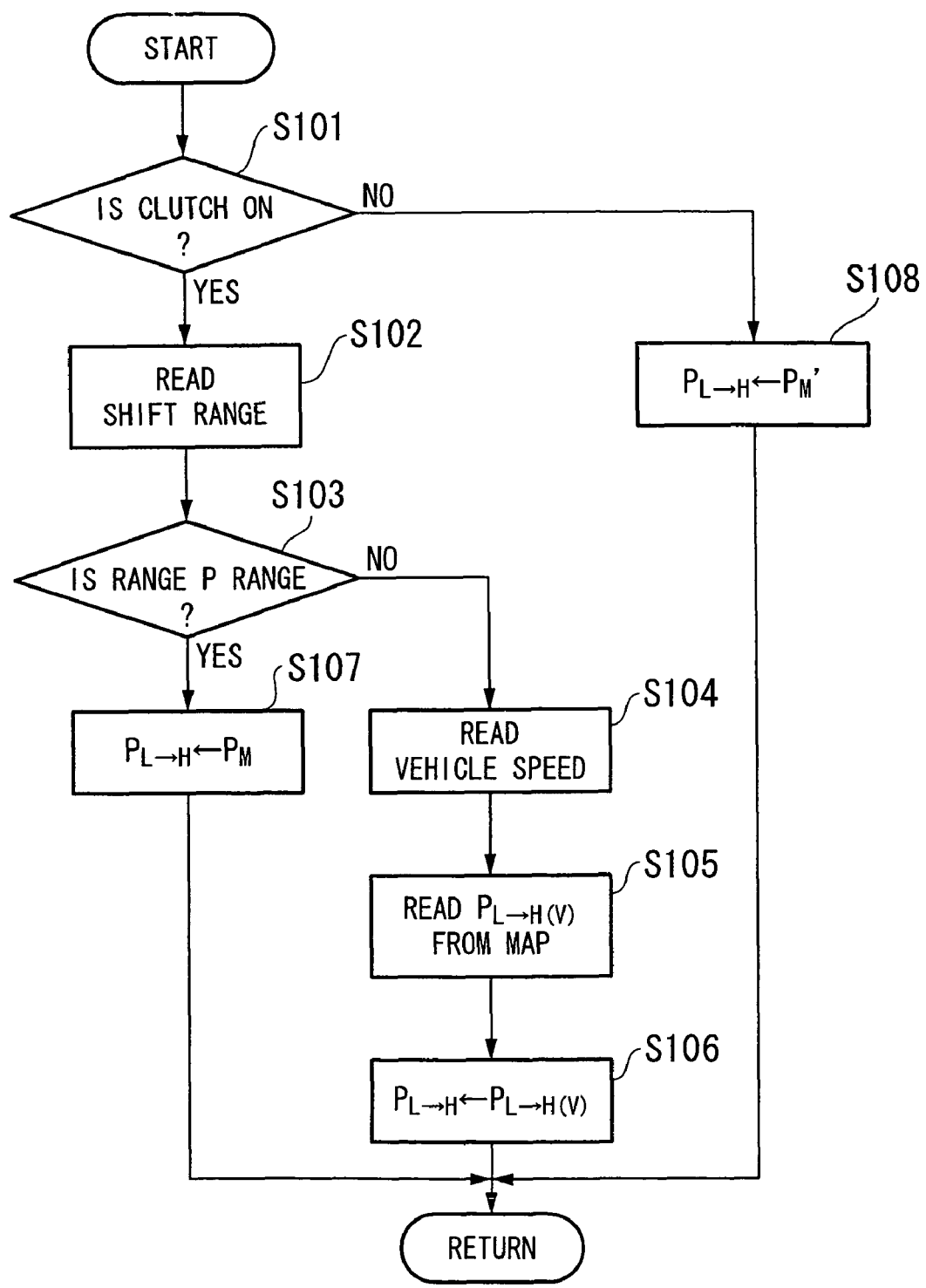
FIG. 3 is a flowchart showing processing to set top and bottom pressure limits in a first embodiment.
Figure 4:
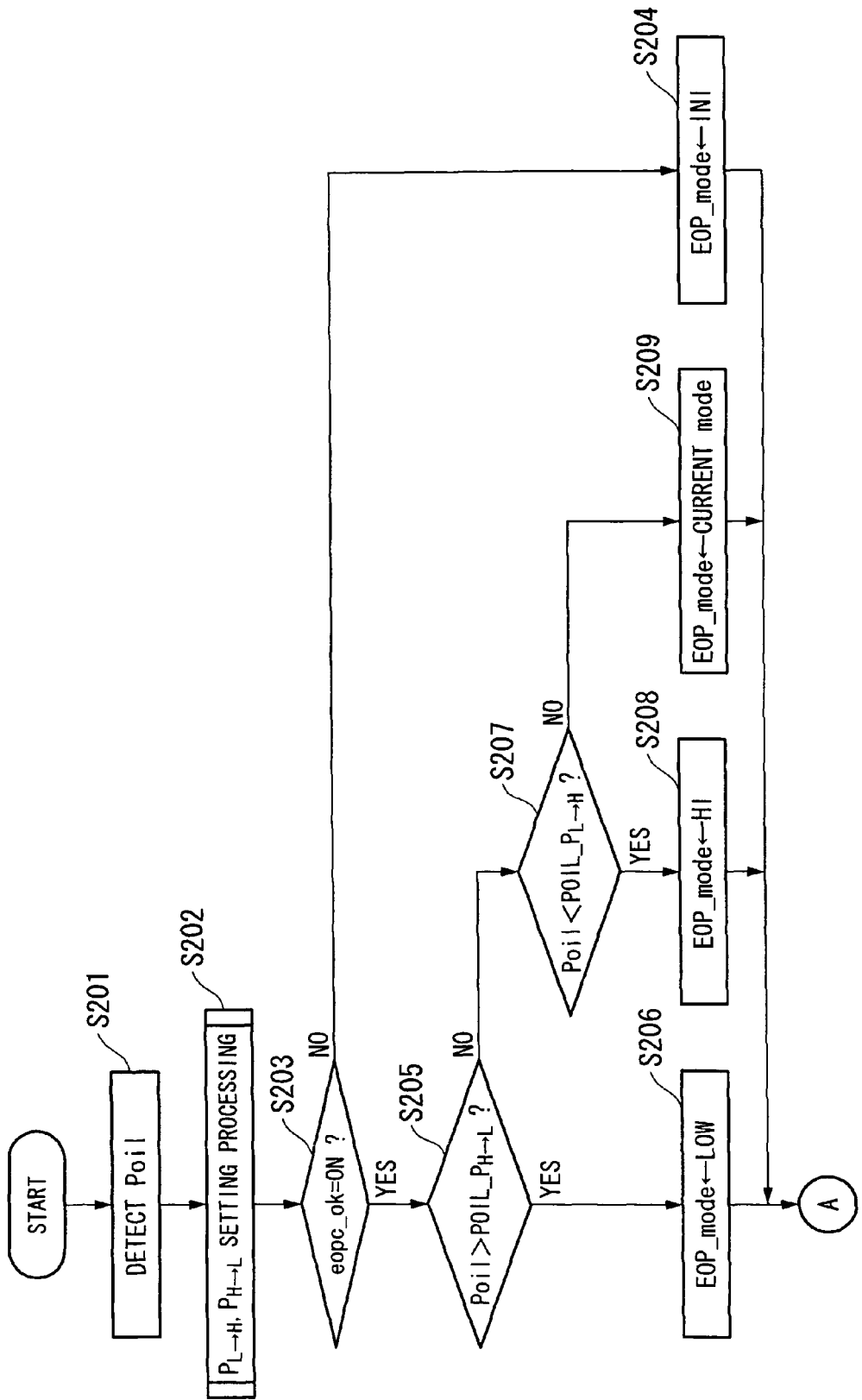
FIG. 4 is a flowchart (i.e., part 1) showing processing to switch a regulator valve in the first embodiment.
Figure 5:
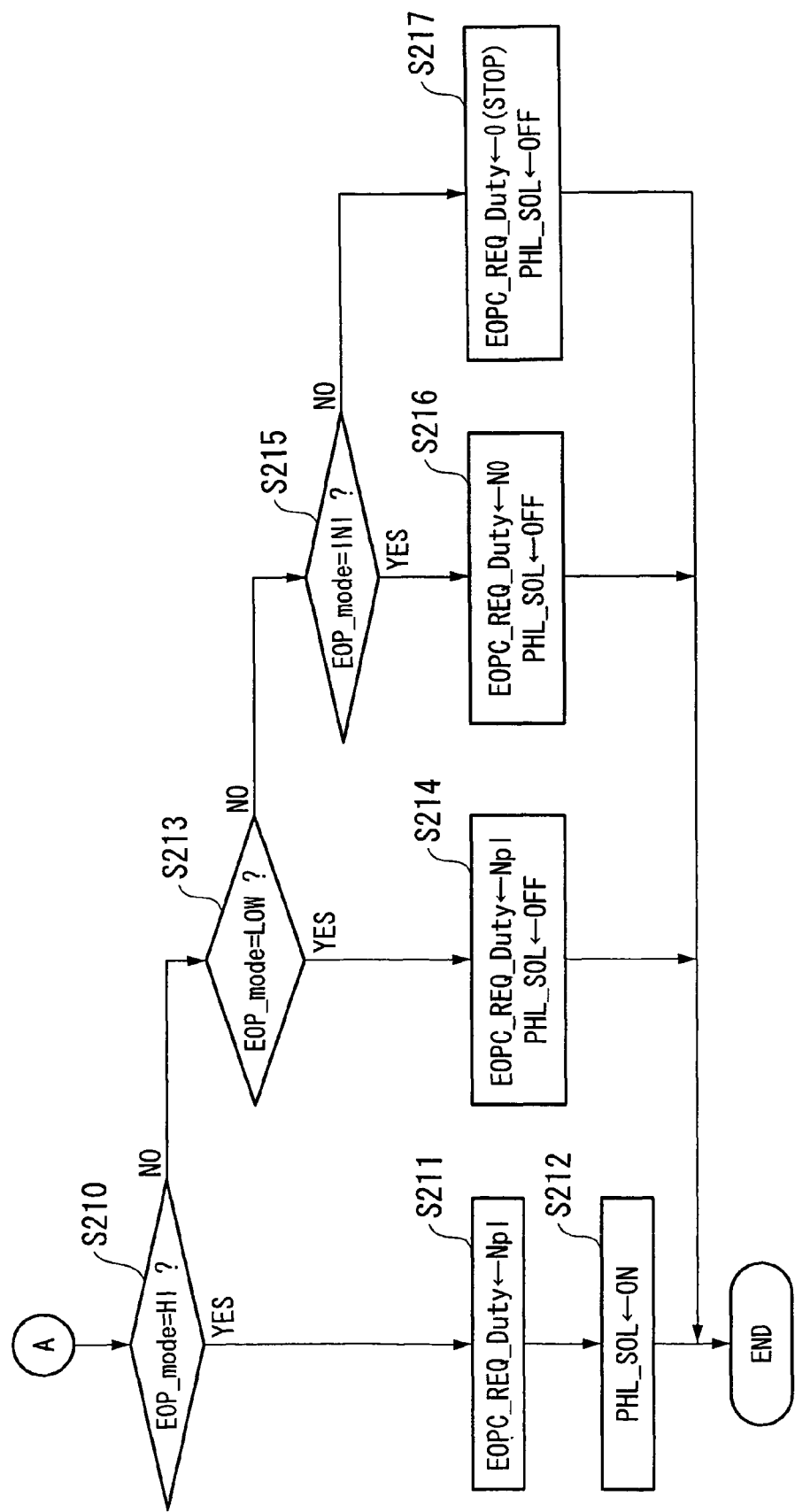
FIG. 5 is a flowchart (i.e., part 2) showing processing to switch a regulator valve in the first embodiment.

A first embodiment of the top and bottom pressure limit setting processing (i.e., $P_{L \to H}$ and $P_{H \to L}$ setting processing) and the regulator valve 22 switching processing are described below in accordance with the flowcharts shown in FIGS. 3 to 5.

Firstly, the top and bottom pressure limit setting processing will be described in accordance with the flowchart in FIG. 3. The top and bottom pressure limit setting processing routine shown in the flowchart in FIG. 3 is executed repeatedly at predetermined times by the controller 10.

Firstly, in step S101, whether or not the hydraulic clutch 7 is ON is determined. In the present embodiment, it is determined that the hydraulic clutch 7 is ON when the solenoid 24a of the clutch control valve 24 is being energized.

If the result of the determination in step S101 is YES (i.e., if the hydraulic clutch 7 is ON), the routine moves to step S102 and the shift range of the vehicle 1 is read. The routine then advances to step S103, and whether or not the read shift range is the parking range (abbreviated below to the P range) is determined.

If the result of the determination in step S103 is NO (i.e., if the range is other than the P range), the routine moves to step S104 and the vehicle speed of the vehicle 1 is read by the vehicle speed sensor 34. Here, the fact that the result of the determination in step S103 is NO means that the hydraulic clutch 7 is engaged and the vehicle 1 is in a driving condition. The vehicle speed at this time is a function of the revolution speed of the electric motor 3 and when the revolution speed increases, the vehicle speed also increases. Accordingly, in the present first embodiment, it can be said that the vehicle speed sensor 34 is a revolution speed measuring device that measures the revolution speed of the electric motor 3. Hereinafter, in the present application, any range other than the P range is generically referred to as being a running range.

Figure 6:
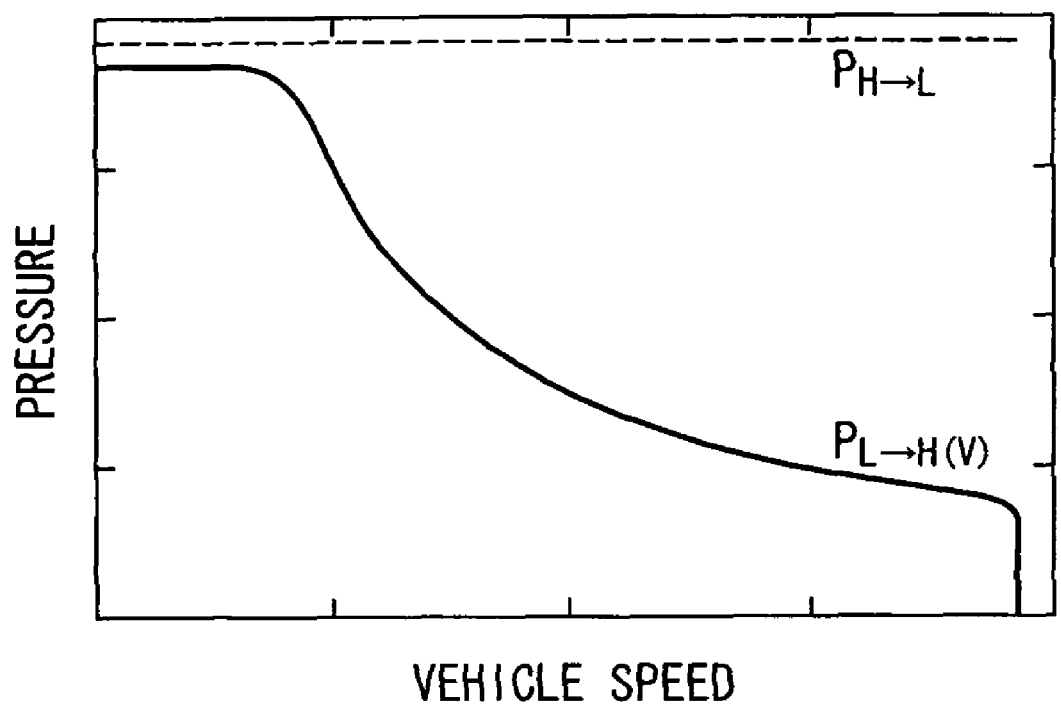
FIG. 6 is a bottom pressure limit map used in top and bottom pressure limit setting processing of the first embodiment.

Next, the routine proceeds to step 105 where the bottom pressure limit map shown in FIG. 6 is referred to and a bottom pressure limit (in other words, a bottom pressure limit $P_{L \to H}$ $(V)$ that corresponds to the revolution speed of the electric motor 3) that corresponds to the vehicle speed is read. Here, the bottom pressure limit $P_{L \to H(V)}$ that corresponds to the vehicle speed is set to the minimum value (or to a value that is slightly greater than this minimum value) for the hydraulic pressure that makes it possible to secure the engaging force that is required for the hydraulic clutch 7 to transmit the maximum torque that can be output by the electric motor 3 in accordance with the revolution speed. Namely, the bottom pressure limit $P_{L \to H(V)}$ that corresponds to the vehicle speed is set so as to correspond to the output characteristics of the electric motor 3.

In this manner, if the bottom pressure limit $P_{L \to H(V)}$ is set so as to correspond to the output characteristics of the electric motor 3, then irrespective of the vehicle speed at which the vehicle 1 is running, it is still possible to secure in the hydraulic clutch 7 the engaging force that is required to transmit the maximum torque that can be output by the electric motor 3 at the revolution speed at that time. As a result, it is possible to perform reliable and satisfactory energy transmission between the electric motor 3 and the rear wheels 2. Moreover, because it is possible to set a bottom pressure limit $P_{L \to H(V)}$ that decreases as the vehicle speed increases, it is possible to reduce the frequency at which operations change from low-pressure mode to high-pressure mode as the vehicle speed increases. Accordingly, it is possible to reduce power consumption by the electric motor 21a of the electric oil pump 21. As a result, it is possible to reduce power consumption while satisfying the engagement requirements (i.e., the operating requirements) of the hydraulic clutch 7.

Note that, in the present embodiment, when the hydraulic clutch 7 is in an engaged state, the bottom pressure limit $P_{L \to H(V)}$ is determined in accordance with the vehicle speed, however, because the vehicle speed is a function of the revolution speed of the electric motor 3 when the hydraulic clutch 7 is in an engaged state, it is also possible to directly measure the revolution speed of the electric motor 3 and determine the bottom pressure limit $P_{L \to H(V)}$ in accordance with the revolution speed of the electric motor 3 instead of with the vehicle speed. Alternatively, instead of the vehicle speed or revolution speed of the electric motor 3, it is also possible to use another parameter having a correlation with the vehicle speed.

Next, the routine moves to step S106, and the bottom pressure limit $P_{L \to H}$ used in the processing to switch the regulator valve 22 (described below) is altered to the bottom pressure limit $P_{L \to H(V)}$ that was read in step S105, and the processing of this routine is temporarily ended.

If, on the other hand, the result of the determination in step S103 is YES (i.e., if the range is the P range), then because the vehicle 1 is in a stopped state with the hydraulic clutch 7 engaged, the routine moves to step S107 in which the bottom pressure limit $P_{L \to H}$ is set to a first invalid stroke fill-in pressure $P_M$ and the processing of this routine is temporarily ended. Here, this first invalid stroke fill-in pressure $P_M$ is the pressure required to substantially eliminate (i.e., fill in an invalid stroke) the gap between the driving side and the driven side of the hydraulic clutch 7 when the fluid supply path 25 and the clutch fluid path 32 are placed in a connected state by the clutch control valve 24. This first invalid stroke fill-in pressure $P_M$ is a smaller pressure (i.e., $P_M < P_{L \to H(V=0)}$) than the bottom pressure limit $P_{L \to H(V=0)}$ that is set on the bottom pressure limit map when the vehicle speed is 0.

In this manner, the setting of the bottom pressure limit $P_{L \to H}$ when the range is the P range to the first invalid stroke fill-in pressure $P_M$ is due to the following reasons (1) to (3).
(1) Even if the hydraulic clutch 7 is ON, when the range is the P range, the vehicle is stopped and the electric motor 3 is also stopped. Therefore, even if the hydraulic pressure in the fluid supply path 25 decreases to the invalid stroke fill-in pressure $P_M$, essentially no problem arises.
(2) Because the first invalid stroke fill-in pressure $P_M$ is smaller than the bottom pressure limit $P_{L \to H(V=0)}$ that is set when the vehicle speed is 0 in a running range, it is possible to reduce the frequency of switching from low-pressure mode to high-pressure mode in the P range as well, and it is possible to reduce power consumption by the electric motor 21a of the electric oil pump 21.

(3) In the P range, if at least the first invalid stoke fill-in pressure $P_M$ is secured as the pressure in the fluid supply path 25, then even when there is a change from the P range to a running range and the bottom pressure limit $P_{L \to H}$ is altered from the first invalid stoke fill-in pressure $P_M$ to the bottom pressure limit $P_{L \to H(V)}$ that corresponds to the vehicle speed, the pressure can be raised rapidly to the bottom pressure limit $P_{L \to H(V)}$ that corresponds to the required vehicle speed in the running range, and it is possible to deal rapidly with engagement demands (i.e., with operating demands) of the hydraulic clutch 7.

Moreover, if the result of the determination in step S101 is NO (i.e., if the hydraulic clutch 7 is OFF), then the routine moves to step S108 in which the bottom pressure limit $P_{L \to H}$ is set to a second invalid stroke fill-in pressure $P_M'$ and the processing of this routine is temporarily ended. Here, the second invalid stroke fill-in pressure $P_M'$ is the pressure at which invalid stoke filling-in becomes possible at the hydraulic pressure accumulated in the accumulator 26 when the clutch control valve 24 is switched from a state in which the fluid supply path 25 and the clutch fluid path 32 are not connected to a state in which the fluid supply path 25 and the clutch fluid path 32 are connected. The second invalid stroke fill-in pressure $P_M'$ is smaller than the bottom pressure limit $P_{L \to H(V=0)}$ that is set on the bottom pressure limit map when the vehicle speed is 0, and is also set so as to be larger than the first invalid stroke fill-in pressure $P_M$ (i.e., $P_M < P_M' < P_{L \to H(V=0)}$).

In this manner, the setting of the bottom pressure limit $P_{L \to H}$ when the hydraulic clutch 7 is OFF to the second invalid stroke fill-in pressure $P_M'$ is due to the following reasons (1) to (3).

(1) When the hydraulic clutch 7 is OFF, there is essentially no problem if the hydraulic pressure in the fluid supply path 25 decreases to the second invalid stroke fill-in pressure $P_M'$.

(2) Because the second invalid stroke fill-in pressure $P_M'$ is smaller than the bottom pressure limit $P_{L \to H(V=0)}$ that is set when the vehicle speed is 0 in a running range, it is possible to reduce the frequency of switching from low-pressure mode to high-pressure mode when the hydraulic clutch 7 is OFF as well, and it is possible to reduce power consumption by the electric motor 21a of the electric oil pump 21.

(3) If at least the second invalid stoke fill-in pressure $P_M'$ is secured as the pressure in the fluid supply path 25 even when the hydraulic clutch 7 is OFF, then even if the hydraulic clutch 7 is switched from OFF to ON and the range is also switched to a running range, and if the bottom pressure limit $P_{L \to H}$ is altered from the second invalid stoke fill-in pressure $P_M'$ to the bottom pressure limit $P_{L \to H(V)}$ that corresponds to the vehicle speed, the pressure can be raised rapidly to the bottom pressure limit $P_{L \to H(V)}$ that corresponds to the required vehicle speed in the running range, and it is possible to deal rapidly with engagement demands (i.e., with operating demands) of the hydraulic clutch 7.

By executing the top and bottom pressure limit setting processing in this manner, the bottom pressure limit $P_{L \to H}$, which is a threshold value for switching from a low-pressure mode to a high-pressure mode, is altered in accordance with the operating state of the vehicle. Note that, in the present first embodiment, the top pressure limit $P_{H \to L}$ is set to a constant value irrespective of the vehicle speed (i.e., irrespective of the revolution speed of the electric motor 3) and, as is shown in FIG. 6, the top pressure limit $P_{H \to L}$ is set to a predetermined pressure that is larger than the bottom pressure limit $P_{L \to H(V=0)}$ that is set when the vehicle speed is 0 on the bottom pressure limit map.

In the present first embodiment, a pressure setting device is realized by the controller 10 executing the processing sequence of steps S101 to S108.

Next, processing to switch the regulator valve 22 will be described following the flowcharts in FIGS. 4 and 5. The switching processing routine shown in the flowcharts in FIGS. 4 and 5 is repeatedly executed at fixed times by the controller 10.

In step S201, after the hydraulic pressure Poil in the fluid supply path 25 has been measured by the hydraulic pressure sensor 31, the routine moves to step S202 in which the above described top and bottom pressure limit setting processing (i.e., steps S101 to S108) is executed and the bottom pressure limit $P_{L \to H}$ and top pressure limit $P_{H \to L}$ are set. Note that, in the first embodiment, even if the top and bottom pressure limit setting processing is executed, there is essentially no alteration in the top pressure limit $P_{H \to L}$ and it is set to a constant fixed pressure.

Next, the routine moves to step S203 and whether or not a load operating allowance signal from the electric oil pump 21 has been input is determined (i.e., does eopc_ok=ON?).

If the result of the determination in step S203 is NO (i.e., if eopc_ok≠ON), the routine moves to step S204 and the operating mode (abbreviated below to EOP mode) of the electric oil pump 21 is set to startup mode (INI). The routine then moves to step S210.

If the result of the determination in step S203 is YES (i.e., if eopc_ok=ON), the routine moves to step S205, and whether or not the hydraulic pressure Poil in the fluid supply path 25 that was measured in step S201 is greater than the top pressure limit $P_{H \to L}$ that was set in step S202 is determined.

If the result of the determination in step S205 is YES (i.e., if Poil>$P_{H \to L}$), the routine moves to step S206 and the EOP mode is set to a low-pressure mode. The routine then moves to step S210.

If the result of the determination in step S205 is NO (i.e., if Poil≦$P_{H \to L}$), the routine moves to step S207 and whether or not the hydraulic pressure Poil in the fluid supply path 25 that was measured in step S201 is less than the bottom pressure limit $P_{L \to H}$ that was set in step S202 is determined.

If the result of the determination in step S207 is YES (i.e., if Poil<$P_{L \to H}$), the routine moves to step S208 and the EOP mode is set to a high-pressure mode. The routine then moves to step S210.

If the result of the determination in step S207 is NO (i.e., if Poil≧$P_{L \to H}$), then because the hydraulic pressure in the fluid supply path 25 is equal to or greater than the bottom pressure limit $P_{L \to H}$ and is also equal to or less than the top pressure limit $P_{H \to L}$, the routine moves to step S209 and the EOP mode is kept at its current mode. Namely, if the current mode is a low-pressure mode, then the low-pressure mode is maintained, while if the current mode is a high-pressure mode, then the high-pressure mode is maintained.

Next, in step S210, whether or not the EOP mode is a high-pressure mode is determined. If the result of the determination in step S210 is YES (i.e., if the EOP mode is a high-pressure mode), the routine moves to step S211 and the target revolution speed of the electric motor 21a of the electric oil pump 21 is set to a predetermined revolution speed Npl. The routine then further moves to step S212 and the solenoid 29a of the switching control valve 29 is turned ON and is energized. As a result, the pump fluid path 27 and the pilot fluid path 28 are connected so that the regulator valve 22 is set to the high-pressure side. The processing of this routine is then temporarily ended. As a result, the pressure in the fluid supply path 25 begins to rise.

If, however, the result of the determination in step S210 is NO, the routine moves to step S213 and whether or not the EOP mode is a low-pressure mode is determined.

If the result of the determination in step S213 is YES (i.e., if the EOP mode is a low-pressure mode), the routine moves to step S214 and the target revolution speed of the electric motor 21a of the electric oil pump 21 is set to a predetermined revolution speed Npl. In addition, the solenoid 29a of the switching control valve 29 is turned OFF and the energizing is stopped. As a result, the pump fluid path 27 and the pilot fluid path 28 are interrupted, the fluid chamber 22e is opened to the atmosphere, and the regulator valve 22 is set to the low-pressure side. The processing of this routine is then temporarily ended. As a result, the rise in the pressure in the fluid supply path 25 is stopped.

Note that, in the present embodiment, in both the high pressure mode and the low pressure mode, the target revolution speed of the electric motor 21a is set to the same predetermined revolution speed Npl, however, it is also possible to alter the target revolution speed of the electric motor 21a in accordance with the mode.

If the result of the determination in step S213 is NO, the routine moves to step S215 and whether or not the EOP mode is the startup mode is determined.

If the result of the determination in step S215 is YES (i.e., if the EOP mode is the startup mode), the routine moves to step S216 and the target revolution speed of the electric motor 21a of the electric oil pump 21 is set to a startup revolution speed N0. In addition, the solenoid 29a of the switching control valve 29 is set to OFF and the energizing thereof is stopped. As a result, the pump fluid path 27 and the pilot fluid path 28 are interrupted, the fluid chamber 22e is opened to the atmosphere, and the regulator valve 22 is set to the low-pressure side. The processing of this routine is then temporarily ended.

If the result of the determination in step S215 is NO, then because the EOP mode is stop mode, the routine moves to step S217 and the target revolution speed of the electric oil pump 21 is set to 0 (i.e. is stopped). In addition, the solenoid 29a of the switching control valve 29 is set to OFF and the energizing thereof is stopped. As a result, the regulator valve 22 is set to the low-pressure side, and the processing of this routine is temporarily ended.

Note that, in the present first embodiment, a pressure increase control device and a pressure increase stopping control device are realized as a result of the controller 10 executing the processing sequence of steps S201 to S217.

In the present first embodiment, the bottom pressure limit $P_{L \to H}$ is set in accordance with the operating state of the vehicle 1, and when the hydraulic pressure in the fluid supply path 25 drops below the bottom pressure limit $P_{L \to H}$, the regulator valve 22 is changed to the high-pressure side and there is a change to the high-pressure mode. Accordingly, in a running range, it is possible to improve the fuel consumption of the vehicle 1 by lowering the power consumption of the electric oil pump 21 while maintaining a reliable and satisfactory energy transmission between the electric motor 3 and the rear wheels 2. Moreover, when the range is the P range or when the hydraulic clutch 7 is OFF, it is still possible to reduce the power consumption of the electric oil pump 21 and improve the fuel consumption of the vehicle 1 while maintaining a state that enables a rapid response to be made to the engagement requirements (i.e., the operating requirements) of the hydraulic clutch 7.

Second Embodiment

The technological basis of the above described first embodiment is the fact that the transmission torque capacity of the hydraulic clutch 7 depends mainly on the supply hydraulic pressure, and the bottom pressure limit $P_{L \to H}$, which is the threshold value at which the electric oil pump 21 is switched from a low-pressure mode to a high-pressure mode, is altered in accordance with the vehicle speed. Consequently, fundamentally, although it is possible to secure the required transmission capacity during an engagement of the hydraulic clutch 7, if this is analyzed in detail, the transmission torque capacity of the hydraulic clutch 7 changes slightly depending on the fluid temperature of the supply fluid. Because there is a reduction in viscosity as the fluid temperature rises, there is a reduction in the transmission torque capacity.

Therefore, in the present second embodiment, it is possible to set a more accurate bottom limit pressure $P_{L \to H}$ by correcting the bottom pressure limit $P_{L \to H}$ in accordance with the fluid temperature in order to compensate for any change in the transmission torque capacity of the hydraulic clutch 7 that is caused by the fluid temperature.

A description of the top and bottom pressure limit setting processing in the second embodiment will now be given with reference made to FIGS. 7 and 8. Note that the switching processing for the regulator valve 22 is the same as in the first embodiment. Therefore, the flowcharts in FIGS. 4 and 5 may be invoked and a description thereof here is omitted.

Figure 7:
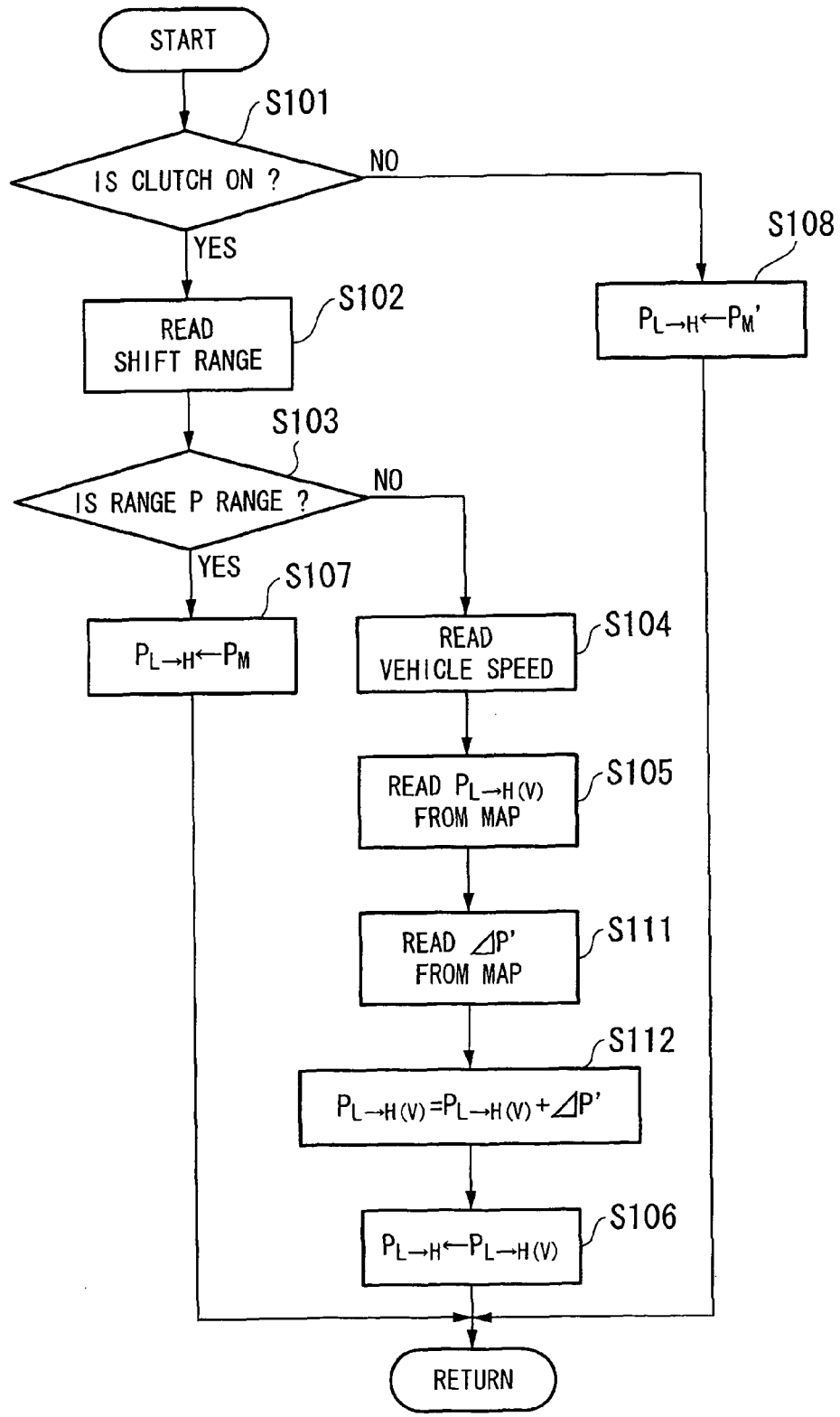
FIG. 7 is a flowchart showing processing to set top and bottom pressure limits in a second embodiment.

A top and bottom pressure limit setting processing routine that is shown in the flowchart in FIG. 7 is executed repeatedly at predetermined times by the controller 10.

Steps S101 to S105 of the top and bottom pressure limit processing in the second embodiment correspond to steps S101 to S105 of the first embodiment and because the processing contents thereof are the same a description is omitted here.

Figure 8:
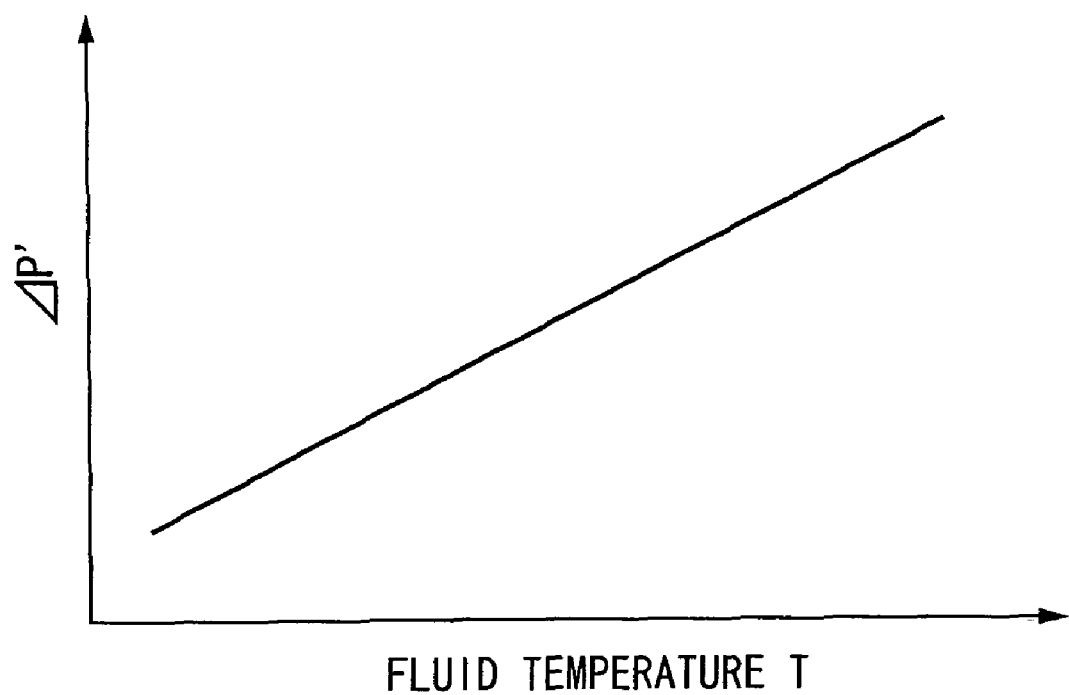
FIG. 8 is a correction pressure map used in the top and bottom pressure limit setting processing of the second embodiment.

In the second embodiment, after the bottom pressure limit $P_{L \to H(V)}$ that corresponds to the vehicle speed has been read in step S105, the routine moves to step S111 and a correction pressure ΔP' that corresponds to the fluid temperature measured by the fluid temperature sensor 33 is read by referring to the correction pressure map shown in FIG. 8. The correction pressure map is set such that the correction pressure ΔP' increases as a fluid temperature T increases in order to compensate for any reduction in the transmission torque capacity of the hydraulic clutch 7 that is due to a reduction in viscosity caused by a rise in the fluid temperature.

Next, the routine moves to step S112 where the correction pressure ΔP' that was read in step S111 is added to the bottom pressure limit $P_{L \to H(V)}$ corresponding to the vehicle speed that was read in step S105, and the bottom pressure limit $P_{L \to H(V)}$ corresponding to the vehicle speed is corrected ($P_{L \to H(V)} = P_{L \to H(V)} + \Delta P'$). This is referred to below as the bottom pressure limit $P_{L \to H(V)}$ corresponding to the vehicle speed after fluid temperature correction and is distinguished from the bottom pressure limit $P_{L \to H(V)}$ corresponding to the vehicle speed before fluid temperature correction.

Next, the routine moves to step S106 where the bottom pressure limit $P_{L \to H}$ used in the switching processing to switch the regulator valve 22 is changed to the bottom pressure limit $P_{L \to H(V)}$ corresponding to the vehicle speed after fluid temperature correction that was calculated in step S112, and the processing of this routine is temporarily ended.

Steps S107 and S108 correspond to steps S107 and S108 of the first embodiment and because the processing contents thereof are the same a description is omitted here.

By correcting the bottom pressure limit $P_{L \to H}$ in accordance with the fluid temperature in this manner, it is possible to set the bottom pressure limit $P_{L \to H}$ more accurately. As a result, it is possible to reduce even further the frequency at which the electric oil pump 21 is operated in high-pressure mode. Consequently, power consumption can be further reduced and the fuel consumption of the vehicle 1 can be improved even more.

Third Embodiment

Next, a third embodiment of the top and bottom pressure limit setting processing (i.e., $P_{L \to H}$, $P_{H \to L}$ setting processing) and the switching processing for the regulator valve 22 will be described.

Note that the switching processing for the regulator valve 22 in the third embodiment is the same as in the first embodiment. Therefore, the flowcharts in FIGS. 4 and 5 may be invoked and a description thereof here is omitted. Note also that, in the present third embodiment as well, a pressure increase control device and a pressure increase stopping control device are realized as a result of the controller 10 executing the processing sequence of steps S201 to S217.

Figure 9:
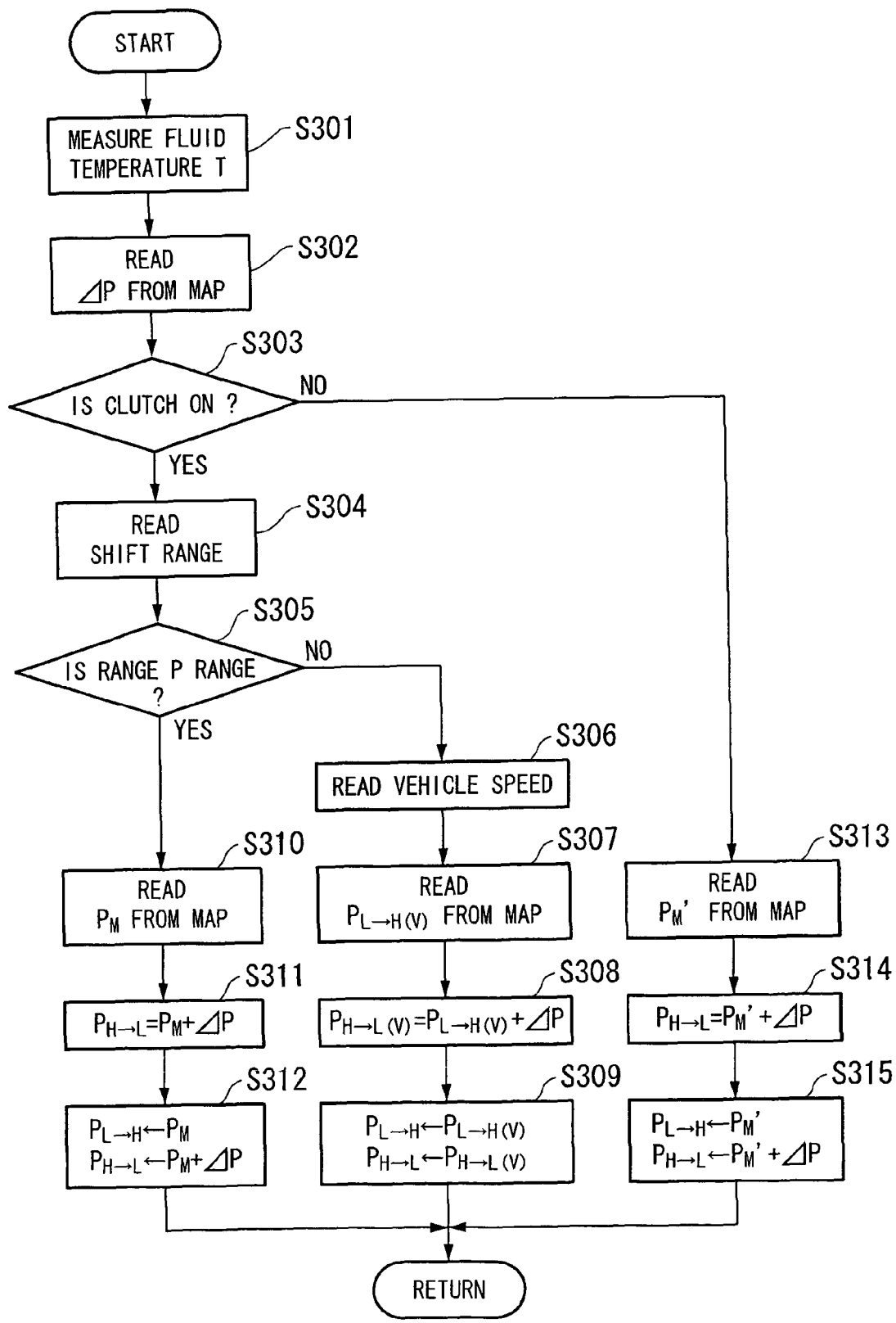
FIG. 9 is a flowchart showing processing to set top and bottom pressure limits in a third embodiment.

The difference between the third embodiment and the first embodiment is the top and bottom pressure limit setting processing executed in step S202 of the switching processing. The top and bottom pressure limit setting processing of the third embodiment will now be described in accordance with the flowchart shown in FIG. 9. The top and bottom pressure limit setting processing routine shown in the flowchart in FIG. 9 is executed repeatedly at predetermined times by the controller 10.

In the above described first embodiment, the top pressure limit $P_{H \to L}$ is made constant irrespective of the vehicle speed, however, in the third embodiment, not only is the bottom pressure limit $P_{L \to H}$ altered in accordance with the vehicle speed (i.e., with the revolution speed of the electric motor 3), but the top pressure limit $P_{H \to L}$ is also altered.

Figure 10:
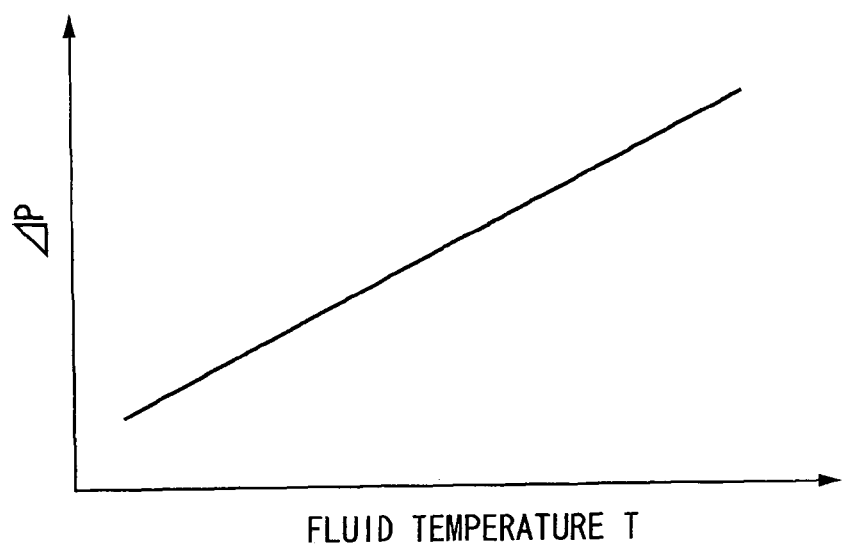
FIG. 10 is a differential pressure map used in the top and bottom pressure limit setting processing of the third embodiment.

Firstly, in step S301, after the fluid temperature T inside the fluid supply path 25 has been measured by the fluid temperature sensor 33 in step S301, the routine moves to step S302 and a differential pressure $\Delta P$ that corresponds to the fluid temperature T is read by referring to the differential pressure map shown in FIG. 10. This differential pressure $\Delta P$ is the differential pressure between the top pressure limit $P_{H \to L}$ and the bottom pressure limit $P_{L \to H}$. On the differential pressure map of the third embodiment, the differential pressure $\Delta P$ is set so as to increase as the fluid temperature T increases in order to compensate for any increase in the amount of fluid leakage from the clutch control valve 24 or the like that is due to a reduction in viscosity caused by a rise in the fluid temperature.

Next, the routine moves to step S303 where whether or not the hydraulic clutch 7 is ON is determined. In the third embodiment, the hydraulic clutch 7 is determined to be ON when the solenoid 24a of the clutch control valve 24 is being energized.

If the result of the determination in step S303 is YES (i.e., if the hydraulic clutch 7 is ON), the routine moves to step S304 and the shift range of the vehicle 1 is read. The routine then further moves to step S305 and whether or not the read shift range is the P range is determined.

If the result of the determination in step S305 is NO (i.e., if the range is other than the P range, namely, is a running range), the routine moves to step S306 and the vehicle speed of the vehicle 1 is read. Here, a determination result in step S305 of NO means that the hydraulic clutch 7 is engaged and the vehicle 1 is traveling. The vehicle speed at this time is a function of the revolution speed of the electric motor 3 and when the revolution speed increases, the vehicle speed also increases.

Figure 11:
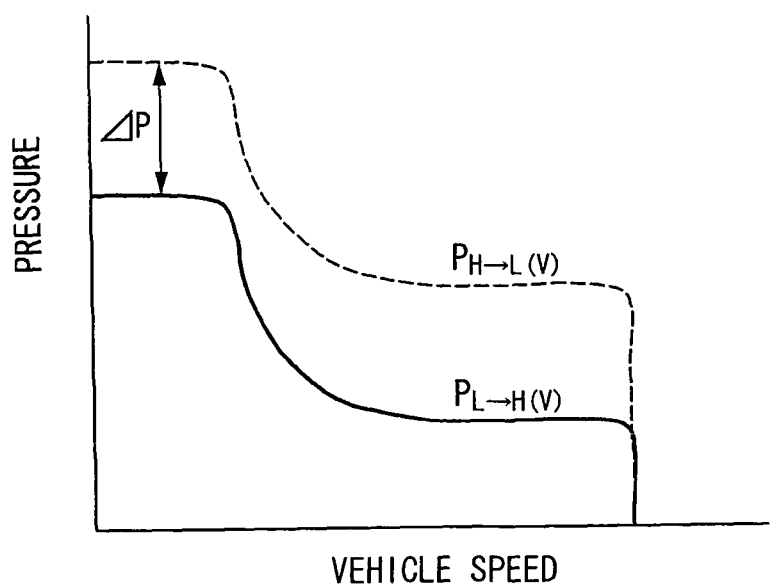
FIG. 11 is a bottom pressure limit map used in the top and bottom pressure limit setting processing of the third embodiment.

Next, the routine moves to step S307 and a bottom pressure limit that corresponds to the vehicle speed, in other words, the bottom pressure limit $P_{L \to H(V)}$ that corresponds to the revolution speed of the electric motor 3 is read by referring to the bottom pressure limit map shown in FIG. 11 (shown by the solid line in FIG. 11). Note that the bottom pressure limit map shown in FIG. 11 is exactly the same as the bottom pressure limit map of the first embodiment that is shown in FIG. 6, and the bottom pressure limit $P_{L \to H(V)}$ that corresponds to the vehicle speed is set so as to correspond to the output characteristics of the electric motor 3.

Accordingly, in the case of the third embodiment as well, in the same way as for the first embodiment, irrespective of the vehicle speed at which the vehicle 1 is running, it is still possible to secure in the hydraulic clutch 7 the engaging force that is required to transmit the maximum torque that can be output by the electric motor 3 at the revolution speed at that time. As a result, it is possible to perform reliable and satisfactory energy transmission between the electric motor 3 and the rear wheels 2. Moreover, because it is possible to set a decreasing bottom pressure limit $P_{L \to H(V)}$ as the vehicle speed increases, it is possible to reduce the frequency at which operations change from low-pressure mode to high-pressure mode as the vehicle speed increases. Accordingly, it is possible to reduce power consumption by the electric motor 21a of the electric oil pump 21. As a result, it is possible to reduce power consumption while satisfying the engagement requirements (i.e., the operating requirements) of the hydraulic clutch 7.

Next, the routine moves to step S308 and the differential pressure $\Delta P$ that was read in step S302 is added to the bottom pressure limit $P_{L \to H(V)}$ that was read in step S307, and the top pressure limit $P_{H \to L(V)}$ is calculated ($P_{H \to L(V)} = P_{L \to H(V)} + \Delta P$). The top pressure limit $P_{H \to L(V)}$ that has been calculated in this manner changes in accordance with the vehicle speed as is shown by the broken line in FIG. 11.

Next, the routine moves to step S309 and the bottom pressure limit $P_{L \to H}$ used in the switching processing is changed to the bottom pressure limit $P_{L \to H(V)}$ that was read in step S307. In addition, the top pressure limit $P_{H \to L}$ is changed to the top pressure limit $P_{H \to L(V)}$ that was calculated in step S308, and the processing of this routine is temporarily ended.

Figure 12:
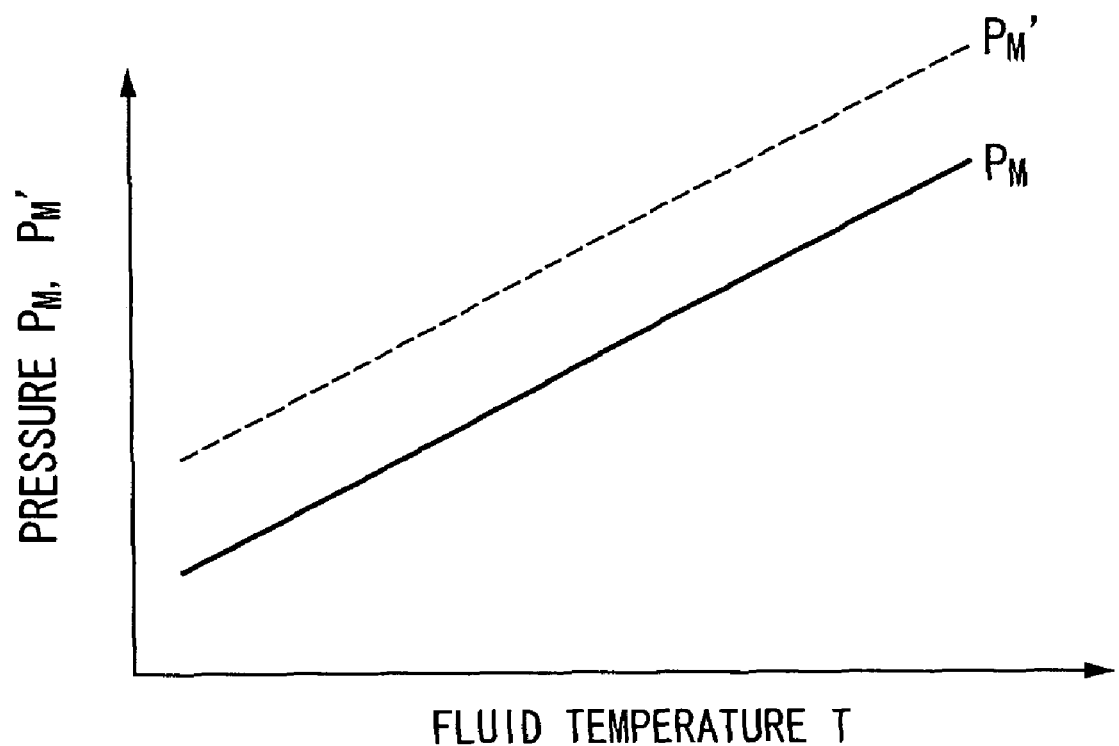
FIG. 12 is an invalid stroke fill-in pressure map used in the top and bottom pressure limit setting processing of the third embodiment.

If, on the other hand, the result of the determination in step S305 is YES (i.e., if the range is the P range), then because the vehicle 1 is in a stopped state with the hydraulic clutch 7 engaged, the routine moves to step S310 and the first invalid stroke fill-in pressure $P_M$ corresponding to the fluid temperature T is read by referring to the invalid stroke fill-in pressure map shown in FIG. 12. The definition of the first invalid stroke fill-in pressure map $P_M$ is the same as in the first embodiment. On the invalid stroke fill-in pressure map of the third embodiment, the first invalid stroke fill-in pressure $P_M$ is set so as to increase substantially in the manner of a linear function as the fluid temperature T increases in order to compensate for any increase in the amount of fluid leakage from the clutch control valve 24 or the like that is due to a reduction in viscosity caused by a rise in the fluid temperature.

In this manner, the reasons for setting the bottom pressure limit $P_{L \to H}$ when the range is the P range to the first invalid stroke fill-in pressure $P_M$ are the same as those in the first embodiment. In the third embodiment as well, in the same way as in the first embodiment, it is possible to reduce the frequency of change from the low-pressure mode to the high-pressure mode in the P range as well, and it is possible to reduce power consumption by the electric motor 21a of the electric oil pump 21. Moreover, when the range is switched from the P range to a running range, it is possible to respond rapidly to the engagement requirements (i.e., the operating requirements) of the hydraulic clutch 7.

Next, the routine moves to step S311 and the differential pressure ΔP that was read in step S302 is added to the first invalid stroke fill-in pressure $P_M$ that was read in step S310, and the top pressure limit $P_{H \to L}$ is calculated ($P_{H \to L}$= $P_M$+ΔP).

Next, the routine moves to step S312 and the bottom pressure limit $P_{L \to H}$ used in the switching processing is changed to the first invalid stroke fill-in pressure $P_M$ that was read in step S310. In addition, the top pressure limit $P_{H \to L}$ used in the switching processing is changed to the top pressure limit $P_{H \to L}$ (=$P_M$+ΔP) that was calculated in step S311, and the processing of this routine is temporarily ended.

If, however, the result of the determination in step S303 is NO (i.e., if the hydraulic clutch 7 is OFF), the routine moves to step S313 and the second invalid stroke fill-in pressure $P_M'$ corresponding to the fluid temperature T is read by referring to the invalid stroke fill-in pressure map shown in FIG. 12. The definition of the second invalid stroke fill-in pressure map $P_M'$ is the same as in the first embodiment. On the invalid stroke fill-in pressure map of the third embodiment, the second invalid stroke fill-in pressure $P_M'$ is set so as to increase substantially in the manner of a linear function as the fluid temperature T increases in order to compensate for any increase in the amount of fluid leakage from the clutch control valve 24 or the like that is due to a reduction in viscosity caused by a rise in the fluid temperature.

In this manner, the reasons for setting the bottom pressure limit $P_{L \to H}$ when the hydraulic clutch 7 is OFF to the second invalid stroke fill-in pressure $P_M'$ are the same as those in the third embodiment. In the third embodiment as well, in the same way as in the first embodiment, it is possible to reduce the frequency of change from the low-pressure mode to the high-pressure mode when the hydraulic clutch 7 is OFF as well, and it is possible to reduce power consumption by the electric motor 21a of the electric oil pump 21. Moreover, when the hydraulic clutch 7 is switched from OFF to ON and the range is a running range, it is possible to respond rapidly to the engagement requirements (i.e., the operating requirements) of the hydraulic clutch 7.

Next, the routine moves to step S314 and the differential pressure ΔP that was read in step S302 is added to the second invalid stroke fill-in pressure $P_M'$ that was read in step S313, and the top pressure limit $P_{H \to L}$ is calculated ($P_{H \to L}$=$P_M'$+ ΔP).

Next, the routine moves to step S315 and the bottom pressure limit $P_{L \to H}$ used in the switching processing is changed to the second invalid stroke fill-in pressure $P_M'$ that was read in step S313. In addition, the top pressure limit $P_{H \to L}$ used in the switching processing is changed to the top pressure limit $P_{H \to L}$ (=$P_M'$+ΔP) that was calculated in step S314, and the processing of this routine is temporarily ended.

In this manner, by executing the top and bottom pressure limit setting processing in the third embodiment, the bottom pressure limit $P_{L \to H}$, which is a threshold value for switching from a low-pressure mode to a high-pressure mode, and the top pressure limit $P_{H \to L}$, which is a threshold value for switching from a high-pressure mode to a low-pressure mode, are altered in accordance with the operating state of the vehicle.

In the present third embodiment, a pressure setting device is realized by the controller 10 executing the processing sequence of steps S301 to S315.

In the present third embodiment as well, in the same way as in the first embodiment, the bottom pressure limit $P_{L \to H}$ is set in accordance with the operating state of the vehicle 1, and when the hydraulic pressure in the fluid supply path 25 drops below the bottom pressure limit $P_{L \to H}$, the regulator valve 22 is changed to the high-pressure side and there is a change to the high-pressure mode. Accordingly, in a running range, it is possible to improve the fuel consumption of the vehicle 1 by lowering the power consumption of the electric oil pump 21 while maintaining a reliable and satisfactory energy transmission between the electric motor 3 and the rear wheels 2. Moreover, when the range is the P range or when the hydraulic clutch 7 is OFF, it is still possible to reduce the power consumption of the electric oil pump 21 and improve the fuel consumption of the vehicle 1 while maintaining a state that enables a rapid response to be made to the engagement requirements (i.e., the operating requirements) of the hydraulic clutch 7.

Furthermore, in addition to this, in the third embodiment, because the top pressure limit $P_{H \to L}$ is also set in accordance with the operating state of the vehicle so as to correspond to the bottom pressure limit $P_{L \to H}$, and because this top pressure limit $P_{H \to L}$ decreases as the vehicle speed increases, it is possible to reduce the load on the electric motor 21a of the electric oil pump 21 in high-pressure mode when the vehicle speed is high, and, by reducing the power consumption of the electric oil pump 21, it is possible to improve the fuel consumption of the vehicle 1.

Fourth Embodiment

In a fourth embodiment, in contrast to the above described third embodiment, the bottom pressure limit $P_{L \to H}$ is corrected in accordance with the fluid temperature in order to compensate for any change in the transmission torque capacity of the hydraulic clutch 7 that is caused by the fluid temperature.

Next, the fourth embodiment of the top and bottom pressure limit setting processing will be described with reference made to FIG. 13 and invoking the respective maps in FIG. 8 and FIGS. 10 to 12. Note that the switching processing for the regulator valve 22 is the same as in the first embodiment. Therefore, the flowcharts in FIGS. 4 and 5 may be invoked and a description thereof here is omitted.

Figure 13:
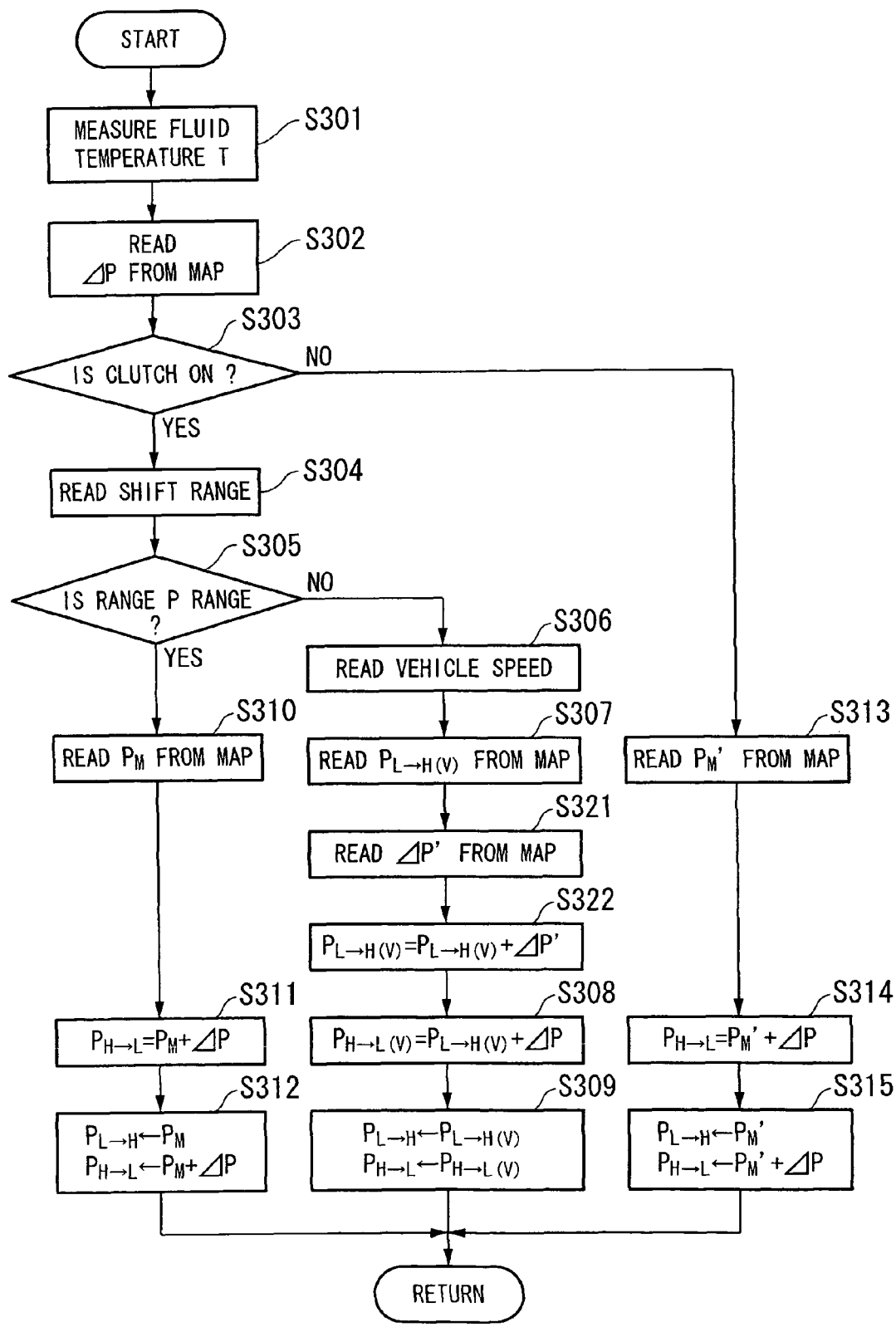
FIG. 13 is a flowchart showing processing to set top and bottom pressure limits in a fourth embodiment.

A top and bottom pressure limit setting processing routine that is shown in the flowchart in FIG. 13 is executed repeatedly at predetermined times by the controller 10.

Steps S301 to S307 of the top and bottom pressure limit processing in the fourth embodiment correspond to steps S301 to S307 of the third embodiment and because the processing contents thereof are the same a description is omitted here.

In the fourth embodiment, after the bottom pressure limit $P_{L \to H(V)}$ that corresponds to the vehicle speed has been read in step S307, the routine moves to step S321 and a correction pressure ΔP' that corresponds to the fluid temperature measured by the fluid temperature sensor 33 is read by referring to the correction pressure map shown in FIG. 8. The correction pressure map is set such that the correction pressure ΔP' increases as a fluid temperature T increases in order to compensate for any reduction in the transmission torque capacity of the hydraulic clutch 7 that is due to a reduction in viscosity caused by a rise in the fluid temperature.

Next, the routine moves to step S322 where the correction pressure ΔP' that was read in step S321 is added to the bottom pressure limit $P_{L \to H(V)}$ corresponding to the vehicle speed that was read in step S307, and the bottom pressure limit $P_{L \to H(V)}$ corresponding to the vehicle speed is corrected ($P_{L \to H(V)} = P_{L \to H(V)} + \Delta P'$). This is referred to below as the bottom pressure limit $P_{L \to H(V)}$ corresponding to the vehicle speed after fluid temperature correction and is distinguished from the bottom pressure limit $P_{L \to H(V)}$ corresponding to the vehicle speed before fluid temperature correction.

Next, the routine moves to step S308 and the differential pressure ΔP that was read in step S302 is added to the bottom pressure limit $P_{L \to H(V)}$ corresponding to the vehicle speed after fluid temperature correction that was calculated in step S322, and the top pressure limit $P_{H \to L(V)}$ is calculated ($P_{H \to L(V)} = P_{L \to H(V)} + \Delta P$). The top pressure limit $P_{H \to L(V)}$ that has been calculated in this manner changes in accordance with the vehicle speed as is shown by the broken line in FIG. 11.

Next, the routine moves to step S309 and the bottom pressure limit $P_{L \to H}$ used in the switching processing is changed to the bottom pressure limit $P_{L \to H(V)}$ corresponding to the vehicle speed after fluid temperature correction that was calculated in step S322. In addition, the top pressure limit $P_{H \to L}$ is changed to the top pressure limit $P_{H \to L(V)}$ that was calculated in step S308, and the processing of this routine is temporarily ended.

Steps S310 to S315 correspond to steps S310 to S315 of the third embodiment and because the processing contents thereof are the same a description is omitted here.

By correcting the bottom pressure limit $P_{L \to H}$ in accordance with the fluid temperature in this manner, it is possible to set the bottom pressure limit $P_{L \to H}$ more accurately. As a result, it is possible to reduce even further the frequency at which the electric oil pump 21 is operated in high-pressure mode. Consequently, power consumption can be further reduced and the fuel consumption of the vehicle 1 can be improved even more.

Other Embodiments

Note that the present invention is not limited to the respective embodiments described above.

For example, in the above described embodiments, the pressure in the fluid supply path 25 is raised by switching the regulator valve 22 from the low-pressure side to the high-pressure side, however, the present invention is not strictly limited to this structure and method. For example, it is also possible to employ a structure in which hydraulic pressure can be supplied from the electric oil pump 21 to the fluid supply path 25 without passing through a regulator valve. In this structure, the electric oil pump 21 is normally left stopped and when the hydraulic pressure in the fluid supply path 25 falls below a first predetermined pressure, the electric oil pump 21 is operated so as to raise the pressure inside the fluid supply path 25. In this case, the stopping of the electric oil pump 21 is included in low-pressure mode operations, and the operating of the electric oil pump 21 is included in the high-pressure mode operations.

Moreover, the friction engagement device is not limited to a hydraulic clutch and brakes may also be included as a friction engagement device.

Furthermore, in each of the above described embodiments, the description uses as an example a hybrid vehicle that has different driving sources for the front wheels and the rear wheels, however, the present invention may also be applied to an electric vehicle that drives the front wheels and rear wheels using separate electric motors.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A control unit for an electric oil pump that supplies a hydraulic pressure to a friction engagement device that enables driving power from an electric motor that is a driving source of a vehicle to be supplied or suspended between the electric motor and wheels of the vehicle, comprising:
    a one-way valve that permits a circulation of an operating fluid from the electric oil pump to the friction engagement device and blocks the circulation in an opposite direction;
    an accumulator that is connected to a fluid supply path joining the one-way valve to the friction engagement device and accumulates a hydraulic pressure required for operating the friction engagement device;
    a hydraulic pressure measuring device that measures hydraulic pressure inside the fluid supply path;
    a vehicle speed measuring device that measures a vehicle speed of the vehicle; and
    a pressure setting device that sets a first predetermined pressure based on the vehicle speed measured by the vehicle speed measuring device, wherein
    when the friction engagement device is in an engaged state and the hydraulic pressure inside the fluid supply path measured by the hydraulic pressure measuring device falls below the first predetermined pressure, the electric oil pump is operated in a high-pressure mode and the hydraulic pressure is supplied from this electric oil pump to the fluid supply path.

2. The control unit for an electric oil pump according to claim 1, wherein
    the first predetermined pressure is a pressure that enables the maximum torque that can be output by the electric motor for the vehicle speed measured by the vehicle speed measuring device to be transmitted by the friction engagement device.

3. The control unit for an electric oil pump according to claim 1, wherein
    when the hydraulic pressure measured by the hydraulic pressure measuring device exceeds a second predetermined pressure that is greater than the first predetermined pressure, the electric oil pump is operated in a low-pressure mode and the supply of the hydraulic pressure from this electric oil pump to the fluid supply path is stopped.

4. The control unit for an electric oil pump according to claim 3, wherein
    the control unit for an electric oil pump further comprises a fluid temperature measuring device that measures a fluid temperature inside the fluid supply path; and
    the second predetermined pressure is set in accordance with the fluid temperature measured by the fluid temperature measuring device or with the vehicle speed measured by the vehicle speed measuring device.

5. The control unit for an electric oil pump according to claim 1, wherein
    when the friction engagement device is in a disengaged state and the hydraulic pressure inside the fluid supply path measured by the hydraulic pressure measuring device falls below a third predetermined pressure that is set lower than the first predetermined pressure irrespective of the vehicle speed, the electric oil pump is operated in a high-pressure mode and the hydraulic pressure is supplied from this electric oil pump to the fluid supply path.

6. The control unit for an electric oil pump according to claim 1, wherein the control unit for an electric oil pump further comprises a fluid temperature measuring device that measures a fluid temperature of fluid supplied to the friction engagement device; and the first predetermined pressure is corrected based on the fluid temperature measured by the fluid temperature measuring device.

\* \* \* \* \*